United States Patent
Pellegrin et al.

(10) Patent No.: US 9,332,258 B2
(45) Date of Patent: May 3, 2016

(54) METHOD AND DEVICE FOR DISPLAY STREAM COMPRESSION

(71) Applicant: intoPIX SA, Mont-Saint-Guibert (BE)

(72) Inventors: Pascal Pellegrin, Louvain-la-Neuve (BE); Renaud Ambroise, Louvain-la-Neuve (BE); Charles Buysschaert, Auderghem (BE); Gaël Rouvroy, Woluwe-Saint-Pierre (BE)

(73) Assignee: intoPIX SA, Mont-Saint-Guibert (BG)

( * ) Notice: Subject to any disclaimer, the term of this patent is extended or adjusted under 35 U.S.C. 154(b) by 135 days.

(21) Appl. No.: 14/193,250

(22) Filed: Feb. 28, 2014

(65) Prior Publication Data
US 2014/0247999 A1    Sep. 4, 2014

Related U.S. Application Data

(60) Provisional application No. 61/771,165, filed on Mar. 1, 2013.

(51) Int. Cl.
*G06K 9/36* (2006.01)
*H04N 19/635* (2014.01)
*H04N 19/91* (2014.01)

(52) U.S. Cl.
CPC ......... *H04N 19/00824* (2013.01); *H04N 19/91* (2014.11)

(58) Field of Classification Search
USPC ........................................................ 382/232
See application file for complete search history.

(56) References Cited

U.S. PATENT DOCUMENTS

2010/0232497 A1    9/2010    MacInnis et al.
2011/0134258 A1    6/2011    Alacoque

FOREIGN PATENT DOCUMENTS

EP        2012544 A2    1/2009
WO    2010026351 A1    3/2010

OTHER PUBLICATIONS

European Search Report for corresponding EP Application No. 13 168 491.2 dated Jan. 30, 2014.
Kondo, T., et al., "Adaptive Dynamic Range Coding Scheme for Future Consumer Digital VTR", Video Audio and Data Recording, International Conference, Jan. 1, 1988, pp. 219-226, vol. 79, London, Great Britain.
Peng, X., et al., "Highly Parallel Line-Based Image Coding for Many Cores", IEEE Transactions on Image Processing, IEEE Service Center, Jan. 2012, pp. 196-206, vol. 21, No. 1, Piscataway, New Jersey.
European Examination Report for corresponding EP Application No. 13 168 491.2 dated Oct. 26, 2015.

*Primary Examiner* — Duy M Dang
(74) *Attorney, Agent, or Firm* — Norris McLaughlin & Marcus, P.A.

(57) ABSTRACT

A method and a device compress a display stream wherein coefficients are grouped, for each group, the greatest coded line index (GCLI) is determined and only the GCLI lowest weight bits of the coefficients are copied into the output stream together with the value of the GCLI. The method and device provide a good compression efficiency together with a simple hardware.

16 Claims, 5 Drawing Sheets

US 9,332,258 B2

METHOD AND DEVICE FOR DISPLAY STREAM COMPRESSION

CROSS REFERENCE TO RELATED APPLICATION

This application claims the benefit of U.S. Provisional Patent Application No. 61/771,165, filed Mar. 1, 2013, the entirety of which is hereby incorporated by reference into this application.

FIELD

The invention relates to a method for compressing an input data stream comprising a sequence of m-bit words into an output data stream and for decompressing said output data stream. The invention also relates to a device for performing this compression method and a device for performing said decompression method. The invention may be applicable to image or video data streams.

DESCRIPTION OF PRIOR ART

The audio-visual market is rapidly evolving to ultra-high resolution (8192×4320 pixels) and higher frame rate. Real-time hardware compression/decompression systems therefore need to process data at higher and higher pixel rate. To address this problem, a known solution is to either increase clock frequency of the processing circuit or to process several pixels in parallel during one clock cycle. As the maximum clock rate doesn't increase as fast as the demanded pixel rate, the only realistic solution is to process several pixels in parallel. Existing codecs usually achieve this by parallelizing several processing units, each one working on different blocks of pixels. One should be aware that while parallelizing processing unit, the increase of complexity comes not only from the increase of units, but also from the need of a specific module that merges output of each unit and packs them correctly together. This results in an exponential increase of complexity and power for each new technology generation.

Compression of a digital image is typically achieved in 3 steps: de-correlative transform, entropy coding and rate allocation. De-correlative transforms are applied to reduce the entropy of the transformed image by concentrating probabilities of occurrence on a small subset of coefficient values. De-correlative transforms commonly used in image compression are colour transform, inter/intra prediction, DCT or wavelet transforms. The second step, entropy coding, make use of the results of the de-correlative transform to reduce the size of the transformed image. Finally, rate allocation selects data that will be part of the compressed image output stream to achieve the desired compression ratio.

Entropy coding codes a sequence of coefficients which are fixed-length binary words into a sequence of variable length words. Numerous entropy coding methods exist, such as Fixed Length Coding, Variable Length Coding, binary entropy coding (UVLC, zero-trees) or arithmetic coding with various complexity and features.

Block Fixed Length Coding (BFLC) is usually done by block of coefficients. It consists in coding the coefficients with a reduced number of bits which is determined by the maximum value of all coefficients in the block. If the maximum value in a group of eight coefficients is 5, each coefficient can be coded on 3 bits. Coding will then consists in specifying the required number of bits and packing all necessary bits of the coefficients (8*3 bits in the previous example) in the output stream. This method exhibits a low complexity while implemented in software, but can require non negligible hardware complexity when there is a need to process several coefficients in parallel, due to the output data packing process. Beside this, the compression ratio reached is far below the theoretical ratio that could be reached with a perfect entropy coder coding the sequence of coefficients independently.

Variable Length Coding (VLC) is a little bit more complex but achieves better compression ratio. Each coefficient is coded using a variable length binary code. The most probable values are coded with fewer bits than less probable values. It can be achieved using a table that stores the variable length code for each possible input value. When the probability of coding small values (around zero) is very high, the coder will generate few bits, thus achieving a good compression ratio. A first challenge for this kind of compression scheme is to manage to stay close of the optimum compression ratio predicted theoretically. Firstly, because reaching this optimum ratio requires adaptation of the variable length codes to the probability distribution of coefficients value, which is not exactly known in practice. Secondly, because each coefficient must be coded with an integer number of bits, which results in a sub-optimal coding when probabilities are not an exact negative power of two. Regarding hardware implementation, the second challenge is packing together the variable length codes of several coefficients, which is more complex than in BFLC coding. Packing requires dynamic shifts, masking and "or" operations. While there is a need to work on multiple pixels per clock cycle, complexity of the module in charge of packing and merging of each variable length code rises up dramatically.

Binary entropy coders such as UVLC [P. Delogne, B. Macq, Universal variable length coding for an integrated approach to image coding, Annales des Télécommunications, Juillet/Aout 1991, Volume 46, Issue 7-8, pp 452-459] are processing coefficients bit per bit from the most significant bitplane to the least significant bitplane. They are able to process multiple bits before producing an output bit and thus overcome the problem of traditional Variable Length Coding regarding the loss in compression efficiency. UVLC (as well as zero-trees [A. Said, W. A. Pearlman, A new fast and efficient image codec based on set partitioning in hierarchical trees, IEEE Trans. Circuits Systems Video Technol. 6 (3) (June 1996) 243-250]) is splitting the coefficient's bit in two main subsets: significance bits and refinements bits. Significance bits are all bits from the MSB until the first '1' (included), while refinement bits are all bits less significant than the first '1' (those are refining the precision of the decoded value). The probability of being '0' for a significance bit is usually high and it thus allows a good compression ratio, while refinement bits probability is around 0.5. The gain of process entropy coding on the refinement bits is quite limited but requires as much complexity as processing it on significance bits. In the literature, several coders just skip the refinement bit coding and output it as is to reduce the coder complexity.

The most efficient entropy coders are based on binary arithmetic coding (CABAC in H.264 [D. Marpe, H. Schwarz, T. Wiegand, Context-Based Adaptive Binary Arithmetic Coding in the H.264/AVC Video Compression Standard, IEEE Trans. on circuits and systems for video technology, Vol. 13, No. 7, July 2003] and EBCOT-MQ in JPEG2000 [D. Taubman, High performance scalable image compression with EBCOT, IEEE Trans. Image Process. 9 (7) (July 2000) 1158-1170.]). Each bit of the coefficients is associated with its probability of being '0' or '1'. This probability can be estimated in numerous ways, from really simple to extremely complex ones. The probability is used to subdivide one interval into several smaller ones, and the coded bit selects which interval is kept to encode the next bit (Elias coding). This coding scheme allows reaching a rate very close to the entropy level of the coded sequence of bits. However, encoding a single bit requires several arithmetic operations, making it very resource consuming.

A method for entropically transcoding a first binary data stream into a second compressed data stream is known from WO2010026351. Referring to page 10 and FIG. 1 of this document, the method comprises a statistical analysis of a first sequence of data in step 102 to determine the value of B as integer part of the average of the positions of the highest-order bit at "1" of the words of the data set. Afterwards, the actual encoding of all words is performed in steps 104 to 110. Only after these operations, the output sequence of data is prepared and sent. It implies a high latency for such a method. In addition, in this method, each word of the data set is treated sequentially (steps 104 to 110). Therefore this method implies either a high hardware complexity for obtaining a given throughput or a lower throughput with hardware of limited complexity.

Document US20100232497 discloses a lossless and near-lossless image compression method and system. More specifically, at FIG. 5 and at paragraphs 67-74 of said document, an encoding scheme is described where successive sample sizes are adapted according to predicted sample sizes which are obtained from the sizes of previously coded samples. The predicted size may be obtained by computing the average of the sizes of the samples of previous components Many encoding methods are known, which attempt to achieve a better compression. However, these methods imply an increased computational and storage requirement, which make them inapplicable to the high resolutions and high frame rates.

SUMMARY OF THE INVENTION

It is an object of the present invention to provide a method and device for compressing an input data stream into an output data stream and for decompressing said output data stream having an acceptable compression efficiency while minimising codec complexity, especially in a context of low compression ratio (such as 2:1 to 4:1) for high throughput applications.

The invention is defined by the independent claims. The dependent claims define advantageous embodiments.

According to a first aspect of the invention, there is provided a method for compressing an input data stream comprising a sequence of words of m bits into an output data stream, comprising the steps of: a) grouping said words of said sequence into one or more groups of n words of m bits, n being greater than or equal to 2; b) detecting for each group the value of the Greatest Coded Line Index (GCLI), the GCLI being the index of the highest weight non-zero bit among the bits, excluding any sign bit, of the words in said group; c) producing an output data comprising one or more groups of n words of GCLI bits corresponding respectively to the n words of m bits in a corresponding group in the input stream, where the GCLI bits of each word in the output stream are the GCLI bits of lowest weight of the corresponding word in the input stream, and the value of the GCLI; d) producing an output data stream comprising said output data. The index of the lowest significant bit in a word is counted as 1, and indexes are increasing by 1 for each successive higher weight bits.

Preferably, a de-correlative transform step is performed on the input data stream prior to said grouping step.

Said de-correlative transform may advantageously be a DWT 5/3 wavelet transform based on a filter bank.

The value of n may be selected smaller than or equal to 8 or more preferably n is equal to 4.

When said words of m bits are represented as sign-magnitude and comprise a sign bit, said sign bit is copied to the output data together with the corresponding word of GCLI bits. Optionally, said sign bit is not copied to the output data when corresponding word of GCLI bits is zero.

The GCLI's may advantageously be replaced by entropic coding thereof, more advantageously an unary coding.

According to a preferred embodiment, a sequence of groups of n words of m bits correspond respectively to a sequence of n pixels in a row of a display image comprising rows and columns of pixels. The method then may comprise between above steps (c) and (d) the steps of replacing the GCLI's of the second to last groups corresponding to the first row by the difference between the GCLI of said group and an average of the GCLI's of one or more of the previous groups in said sequence;

replacing the GCLI's of the groups in the subsequent rows by the difference between the GCLI of said group and the GCLI of the corresponding group in the previous row and in the same column. In this embodiment, it is necessary to buffer only the GCLI's of the groups of a row, and not the coefficients of the pixels of a row.

According to another preferred embodiment, said group of n words of m bits being are considered in successive bit planes of decreasing weights. The above step d) may then comprise copying the successive bit planes, starting with the highest-order bit plane up to the lowest-significant bit plane in the output data stream. In this embodiment, it is easy to reduce the volume of data or the required bandwidth, if necessary, by simply cutting some of the lowest weight bitplanes of the output data.

According to a second aspect of the invention, there is provided a method for decompressing an input data stream comprising a sequence of groups of n words of GCLI bits, and for each group the value of GCLI, obtainable by the method of the invention, into an output data stream, comprising the step of producing an output data stream comprising for each word of GCLI bits of each group of the input stream, a word of m bits equal to the GCLI lowest weight bits of said words of m bits, and bits at zero for the (m-GCLI) highest-weight bit words.

According to a third aspect of the invention, there is provided a device for compressing an input data stream comprising a sequence of words of m bits into an output data stream, comprising:

means for grouping said words of said sequence into one or more groups of n words of m bits, n being greater than or equal to 2;

means for detecting for each group the value of the Greatest Coded Line Index (GCLI), the GCLI being the index of the highest weight non-zero bit among the bits, excluding any sign bit, of the words in said group;

means for producing an output data comprising one or more groups of n words of GCLI bits corresponding respectively to the n words of m bits in a corresponding group in the input stream, where the GCLI bits of each word in the output stream are the GCLI bits of lowest weight of the corresponding word in the input stream, and the value of the GCLI;

means for producing an output data stream comprising said output data.

Said means for grouping may comprise a set of n registers of m bits for storing n words of m bits from the input stream.

Said means for detecting the GCLI may comprise m logical OR-gates having as input the n bits of a bit plane.

According to a fourth aspect of the invention, there is provided a device for decompressing an input data stream comprising a sequence of groups of n words of GCLI bits, and for each group the value of GCLI, obtainable by the method of any of claims 1 to 8, into an output data stream, comprising: means for producing an output data stream comprising for each word of GCLI bits of each group of the input stream, a word of m bits equal to the GCLI lowest weight bits of said words of m bits, and zero bits for the (m-GCLI) highest-weight bit words.

SHORT DESCRIPTION OF THE DRAWINGS

These and further aspects of the invention will be explained in greater detail by way of example and with reference to the accompanying drawings in which.

The drawings of the figures are neither drawn to scale nor proportioned. Generally, identical components are denoted by the same reference numerals in the figures.

DETAILED DESCRIPTION OF EMBODIMENTS OF THE INVENTION

Figure 1:
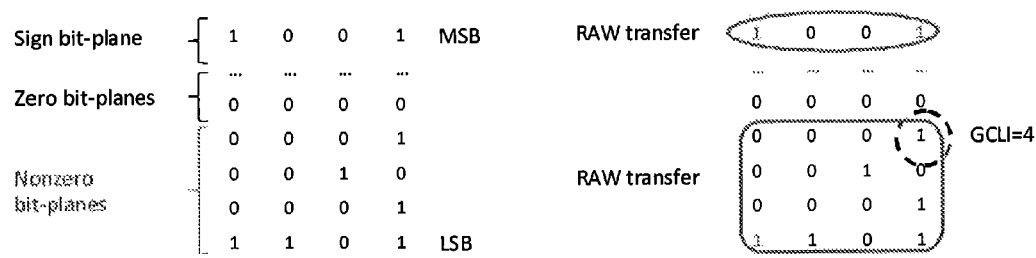
FIG. 1 shows schematically the data as used in the method for compressing of the invention.

FIG. 1 shows schematically an example of the data as used in the method for compressing of the invention. A group of four words (n=4) of m bits of the input stream are represented at the left of FIG. 1, with the lowest significant bits (LSB) at the bottom and the most significant bits (MSB) at the top. A bitplane is the set of bits in the group having same weight. The line index of a bitplane is 1 for the LSB biptlane, and increases upwards. In this example, the words of m bits are represented as sign and magnitude. It is understood that the other known representation of binary numbers (Offset binary, 2's complement, 1's complement) may be used also, and that the method of the invention is applicable to these representations, e.g. by first transforming the numbers to the sign and magnitude representation. In the example of FIG. 1, the GCLI is 4: all bitplanes above the fourth contain only zeros (except for the optional sign bit plane), while the fourth bitplane contains at least one '1'. According to the method of the invention, the sign bits as well as the GCLI bits of lowest weight, i.e. the data encircled in the right hand side of FIG. 1, are copied to the output stream, in a raw transfer. The words of m bits are also known as coefficients, in the field of image processing. For each group, a Greatest Coded Line Index, GCLI, is found. The GCLI is the line index of the most significant non-null bitplane. The GCLI may then be entropy coded and sent to the output stream. The entropy coding method used for coding the GCLI sequence is preferably an easy-to-implement Unary Coding method. If there is at least one non-null bitplane in the group (GCLI>0), the GCLI bitplane, as well as all less significant bitplanes and the sign bitplane are packed in a RAW mode in the output stream. FIG. 1 shows how GCLI can be found from a bitplane representation of the coefficients.

While Fixed Length Coding of the GCLIs already offers an interesting compression ratio, improvement has been brought on top of it to further increase compression ratio while still keeping the low complexity of the solution. It consists in reducing bandwidth needed to transmit GCLI values in the output stream. This solution is detailed hereafter. The input data stream corresponds to a display image having rows and columns of pixels. GCLIs are processed in two steps. In a first step of horizontal prediction, on the first row of each image, GCLIs are predicted as a horizontal combination of its previous neighbours belonging to the same row and the same wavelet subband. The symbol coded is the difference between the GCLI value and the predicted value of the GCLI. In a second step, a vertical prediction is performed between two rows of GCLIs. The result is the difference between the GCLI value and the corresponding GCLI of the same subset of coefficients in the previously coded row. Predictive values may afterwards be coded following an easy-to-implement Unary Coding method (Table 1).

TABLE 1

A simple unary code for GCLI coding.

| Data | Unary code |
|---|---|
| ... | ... |
| −2 | 0011 |
| −1 | 011 |
| 0 | 0 |
| 1 | 010 |
| 2 | 0010 |
| ... | ... |

Figure 2:
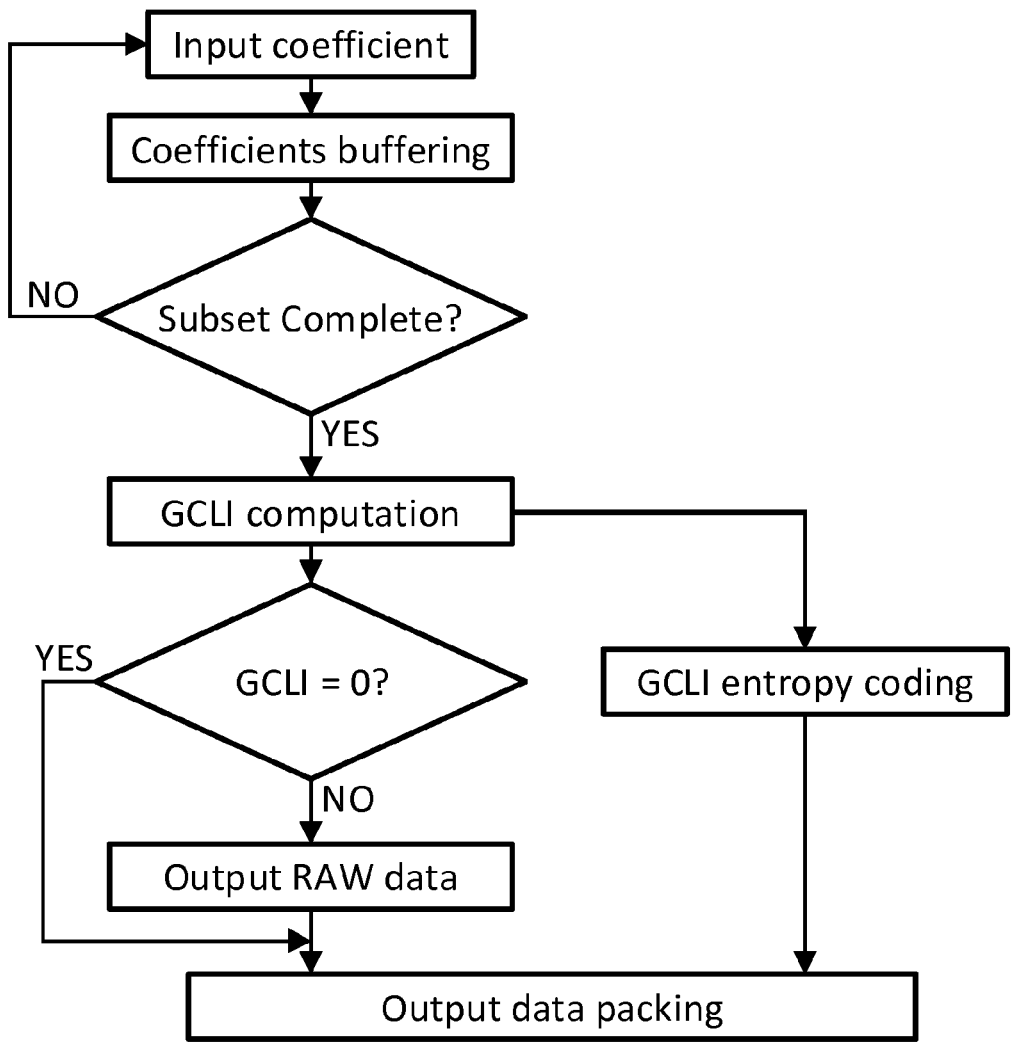
FIG. 2 is a flow-chart representing the operations performed in the method of the invention.

FIG. 2 is a flow-chart representing the operations performed in the method of the invention. Successive coefficients are acquired and buffered. When coefficients of the input stream have been buffered, the coefficients are grouped in groups of n, preferably four. Coefficients of a group belong to the same component, row and subband of the input stream. The GCLI of each group is determined as discussed above. If the GCLI of a group is not equal to zero, the raw data, i.e. the GCLI lowest weight bits of the coefficients of the group are copied to an output buffer and the sign bit plane. The GCLIs are coded and stored in the output buffer with corresponding group.

Figure 3:
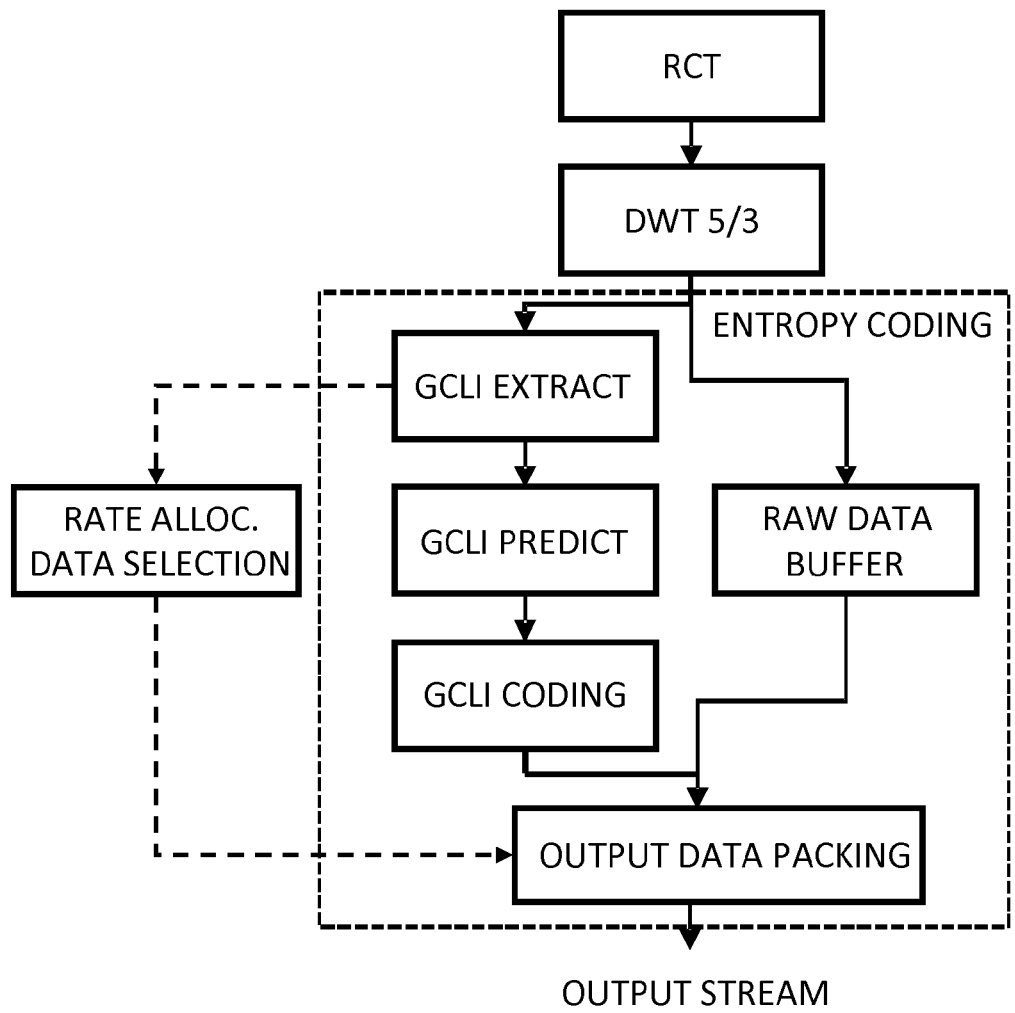
FIG. 3 is a bloc diagram of the hardware of a device according to the invention.

FIG. 3 is a bloc diagram of the hardware of a device according to the invention for performing a new entropic coding scheme. This new entropy coder is used in the context of a digital image compression algorithm. Starting from the top at FIG. 3, a Reversible Colour Transform (RCT) may optionally be performed, allowing a first de-correlation step between the 3 colour components of the image. A second optional step of de-correlative transform may then be applied on the input picture prior to the entropy coding. Many known de-correlative transforms may be used. As an example embodiment, the de-correlative transform that has been used for the assessment of this new solution may be a wavelet transform based on a filter-bank first presented in [D. Le Gall, A. Tabatabai, Subband coding of digital images using symmetric kernel filters and arithmetic coding techniques, in: Proceedings of the International Conference on Acoustics, Speech Signal Processing, N.Y., USA, April 1988, pp. 761-764.], and commonly referred as the DWT 5/3. In order to minimize complexity, this filter was only applied horizontally (line by line), and no vertical de-correlative transform was applied. This horizontal DWT 5/3 can be applied several times recursively, the number of iterations in our algorithm varying from 1 to 8. Coefficients at the output of the DWT 5/3 transform are then entropy coded using the new proposed scheme. The entropy coding (dashed block on FIG. 3) comprises the hardware for performing GCLI extraction, optional GCLI prediction and GCLI coding, as discussed above. The raw data buffer transfers the part of the input stream, i.e. the sign bitplane and the GCLI lower-weight bitplanes of the input stream. On the rate allocation side, the chosen solution is also extremely simple and easy to implement. It comprises trimming the less significant bitplanes of an output packet, in order to reach the targeted output rate. This solution allows realisation of rate allocation without any recoding iteration of the data, but only in managing to keep the good amount of data. In order to reach an optimal quality for the decoded output image, the rate allocation is done on several groups of coefficient, and by weighting the amount of data that must be trimmed for each group. Various mechanisms for determining the amount of data that must be trimmed for each group are known and can be used in the invention.

Figure 4:
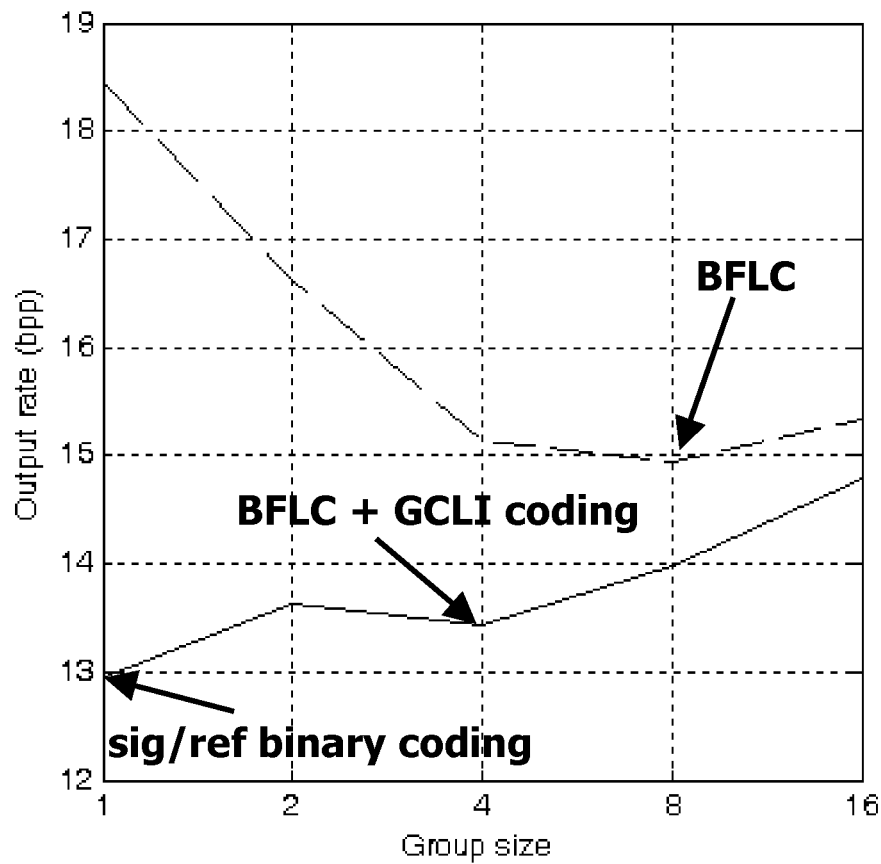
FIG. 4 represents the output rate in bits per pixel (bpp) in dependence of the group size n, for a known method and the method of the invention.

FIG. 4 represents the output rate in bits per pixel (bpp) in dependence of the group size n, for a known method and the method of the invention. The input stream of this simulation comprises three eight bit words per pixels (e.g. RGB coefficients, or YUV coefficients), i.e. 24 bpp (bits per pixel). The two curves represent the number of bits per pixel after compression. The dashed curve represents the results obtained with BFLC (Block Fixed Length Coding) and the continuous curve represents the results obtained with the method of the invention, for different values of n, the group size. It can be seen that the method according to the invention requires much less bits per pixels, i.e. gives a better compression. One obtains a better compression with a group size of 1 (i.e. no grouping), however if no grouping is performed, high date rates can only be obtained with parallelizing, therefore at an increased cost and complexity. Output rate of a standard BFLC method is directly linked to the number of coefficients in each block. There is a trade-off between the bandwidth used by the GCLI information (which rises up if the blocks are smaller), and the bandwidth used by raw data (which rises up while the blocks are bigger). Considering a 4 bits code for each GCLI, FIG. 4 shows the output rate reached (in bits per pixel) with regards to the size of the block for one test picture de-correlated using DWT 5/3 horizontal transformation. Note that when block size is 1, the most significant non-null bit is not coded since it is always '1'. One can see that in these conditions, the best compression ratio is reached while using block size of 8 coefficients and output rate is around 15 bpp. Entropy coding the GCLI values according to the invention drastically changes the trade-off since GCLI bandwidth is modified. FIG. 4 shows the output rate that can be obtained while using a perfect entropy coder for coding the GCLI sequence (size of RAW data+[entropy of the GCLI sequence]×[size of GCLI sequence]). The best compression ratio is achieved when using block size of 1, thus working coefficient per coefficient. In fact, this corner case is perfectly equivalent to a binary entropy coding method that uses the significance/refinement split. It achieves theoretically the same output rate (when refinement bits coding is skipped) but requires also the same high hardware complexity. FIG. 4 also shows that using block of four coefficients represents a limited increase in output rate (13 bpp to 13.5 bpp i.e. around 4%) in comparison to a binary entropy coder which use the significance/refinement split (group size of 1 in the graph—sig/ref binary coding). On the other hand, this small increase of the output rate is compensated by the really low hardware complexity needed to implement this solution. The hardware complexity can be estimated as the sum of a BFLC coder (which is really low), and the complexity of the module used to code the GCLI sequence. As the needed throughput for this second module is very low (it needs to process 1 GCLI of 4 bits instead of 4 coefficients of 16 bits), the complexity of this module remains far below (at least 16 times) the complexity of the binary entropy coder that should encode the 4 coefficients of 16 bits. Furthermore, as this coder works on several coefficients at a time, it intrinsically allows processing several pixels at a time. BFLC combined with entropy coding of GCLI values seems thus to present a great trade-off between hardware complexity and compression efficiency.

Figure 5:
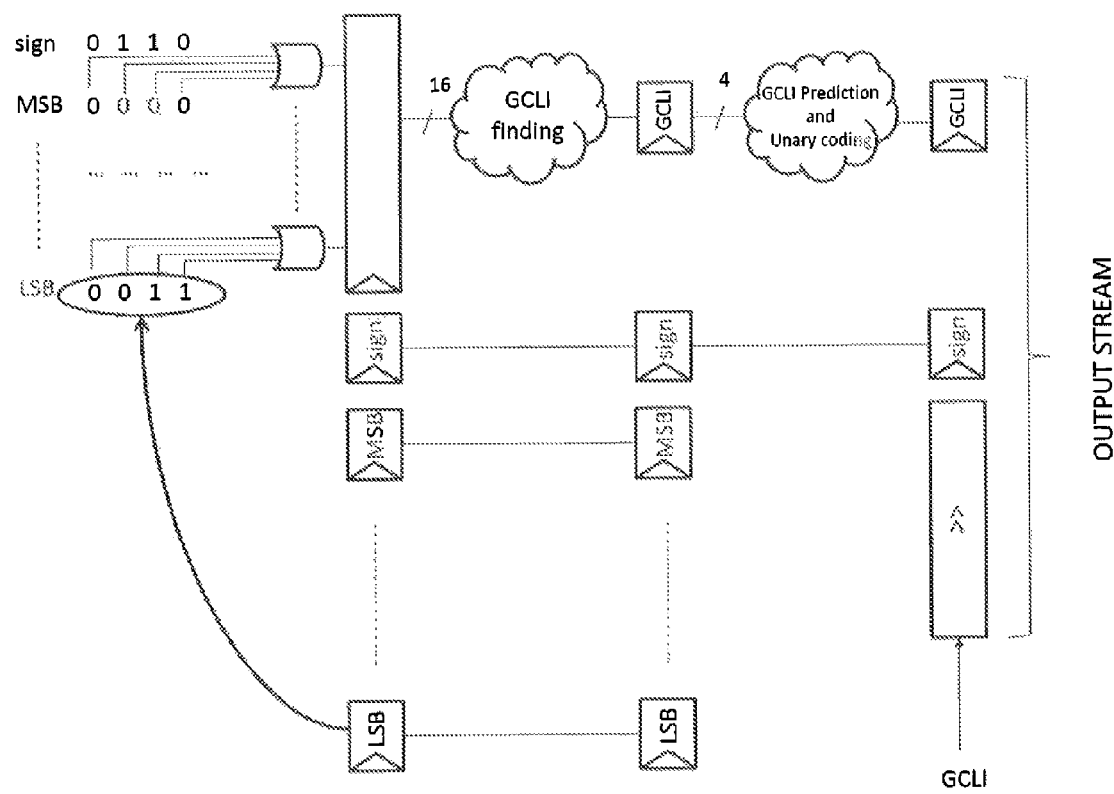
FIG. 5 is a schematic representation of a possible implementation of a device according to the invention.

FIG. 5 is a schematic representation of a possible architecture for a hardware implementation of a device for compressing an input data stream. The number n of groups of words in this example is 4. The means for grouping may comprise 4-input or-gates and a set of 4 registers for storing the 4 words of a group. The means for detecting the GCLI ("GCLI finding") is implemented with a set of logic gates. It emphasizes the extremely low complexity of the solution, especially if it is taken into account that it allows to encode 4 coefficients on the same clock cycle. In this figure, GCLI finding, GCLI prediction and unary coding architectures are not fully specified in a concern of simplicity. In this example, a fast bitwise OR is performed on the four input coefficients of a group. The GCLI is computed as the first '1' met, starting from the MSB, sign bit excepted. It is output an 4 bits. One can easily be convinced on the small hardware complexity of these elements: this block exhibits a very low logical complexity, as it only consists of some logical gates. It mainly comes from the fact that the throughput of data that must be processed is not excessive. Regarding the case of an 8K image @60 Hz, this block needs to process 1.5 G GCLI/s. Considering a 4 bits weight for each GCLI, the GCLI coding needs thus to process 6 Gb/s, which is far below the input data rate of 80 Gb/s needed for an 8K image @60 Hz (3 components/12-bit per component).

This block also needs a buffer to store all GCLI of the previous line, needed to achieve vertical prediction of the GCLI. Its size can be roughly estimated as 24 Kbit for the worst case of 8K image resolution. The size of this buffer scales proportionally with the resolution width of the image. The means for producing the output data and the means for producing the output data stream are implemented using a set of registers and gates. A corresponding device for decompressing an input data stream can be implemented using similar and corresponding hardware. These hardware may be implemented, as well known in the art, using individual gates and registers, ASICs or FPGAs.

Advantages brought by the compression method of the invention are:

Processing is much simpler than in other compression scheme.

Compression efficiency reduction represents a nice trade-off with regards to complexity.

Packing the output codestream is simplified.

Rate allocation process is simple and requires no feedback loops or multi-pass encoding (like PCRD optimizations in JPEG2000).

The method of the invention achieves compression of a group of coefficients in a few steps, in an extremely simple and effective way for hardware implementation. As this compression scheme encodes several pixels at the same time, parallel encoding of multiple pixels is intrinsic to the proposed codec. It allows reaching high pixel rate with a low complexity codec, while keeping good compression efficiency.

The present invention has been described in terms of specific embodiments, which are illustrative of the invention and not to be construed as limiting. More generally, it will be appreciated by persons skilled in the art that the present invention is not limited by what has been particularly shown and/or described hereinabove.

Reference numerals in the claims do not limit their protective scope. Use of the verbs "to comprise", "to include", "to be composed of", or any other variant, as well as their respective conjugations, does not exclude the presence of elements other than those stated. Use of the article "a", "an" or "the" preceding an element does not exclude the presence of a plurality of such elements.

The invention may also be described as follows: the invention provides a method and device for compressing a display stream wherein coefficients are grouped, for each group, the greatest coded line index (GCLI) is determined and only the GCLI lowest weight bits of the coefficients are copied into the output stream together with the value of the GCLI. The invention provides good compression efficiency together with a simple hardware.

The invention claimed is:

1. A method for compressing an input data stream comprising a sequence of words of m bits into an output data stream, the method comprising the steps of:
   a) grouping said words of said sequence into one or more groups of n words of m bits, n being greater than or equal to 2;
   b) detecting for each group a value of the Greatest Coded Line Index (GCLI), the GCLI being the index of the highest weight non-zero bit among the bits, excluding any sign bit, of the words in said group;
   c) producing an output data comprising one or more groups of n words of GCLI bits corresponding respectively to the n words of m bits in a corresponding group in the input stream, where the GCLI bits of each word in the output stream are the GCLI bits of lowest weight of the corresponding word in the input stream, and the value of the GCLI;
   d) producing an output data stream comprising said output data.

2. The method according to claim 1, wherein a de-correlative transform step is performed on the input data stream prior to said grouping step.

3. The method according to claim 2, wherein said de-correlative transform is a DWT 5/3 wavelet transform based on a filter bank.

4. The method according to claim 2, wherein said sequence of words of m bits corresponds to a sequence of pixels in a row of a display image comprising rows and columns of pixels and that said de-correlative transform is performed on said sequence of pixels in a row.

5. The method according to claim 1, wherein n is smaller than or equal to 8.

6. The method according to claim 5, wherein n is equal to 4.

7. The method according to claim 1 wherein said words of m bits are represented as sign-magnitude and comprise a sign bit, and that said sign bit is copied to the output data together with the corresponding word of GCLI bits.

8. The method according to claim 1 comprising between said step (c) and said step (d) the step of replacing the GCLI's by an entropic coding thereof.

9. The method according to claim 8 wherein said entropic coding is a unary coding.

10. The method according to claim 1, wherein a sequence of groups of n words of m bits corresponds respectively to a sequence of n pixels in a row of a display image comprising rows and columns of pixels, and comprising between said step (c) and said step (d) the steps of
   replacing the GCLI's of the second to last groups corresponding to the first row by the difference between the GCLI of said group and an average of the GCLI's of one or more of the previous groups in said sequence;
   replacing the GCLI's of the groups in the subsequent rows by the difference between the GCLI of said group and the GCLI of the corresponding group in the previous row and in the same column.

11. The method according to claim 1, said group of n words of m bits being considered in successive bit planes of decreasing weights, wherein the step of producing an output data stream comprises
   copying the successive bit planes, starting with the highest-order bit plane up to the lowest-significant bit plane in the output data stream.

12. A method for decompressing an input data stream comprising a sequence of groups of n words of GCLI bits, and for each group the value of GCLI, obtainable by the method according to claim 1, into an output data stream, comprising the step of:
   producing an output data stream comprising for each word of GCLI bits of each group of the input stream, a word of m bits equal to the word of GCLI bits for the GCLI lowest-weight bits of said word of m bits, and zero bits for the (m-GCLI) highest-weight bit words.

13. A device for compressing an input data stream comprising a sequence of words of m bits into an output data stream, the device comprising:
   means for grouping said words of said sequence into one or more groups of n words of m bits, n being greater than or equal to 2;
   means for detecting for each group the value of the Greatest Coded Line Index (GCLI), the GCLI being the index of the highest weight non-zero bit among the bits, excluding any sign bit, of the words in said group;
   means for producing an output data comprising one or more groups of n words of GCLI bits corresponding respectively to the n words of m bits in a corresponding group in the input stream, where the GCLI bits of each word in the output stream are the GCLI bits of lowest weight of the corresponding word in the input stream, and the value of the GCLI;
   means for producing an output data stream comprising said output data.

14. The device according to claim 13, wherein said means for grouping comprise a set of n registers of m bits for storing n words of m bits from the input stream.

15. The device according to claim 13, wherein said means for detecting the GCLI comprises m logical OR-gates having as input the n bits of a bit plane.

16. A device for decompressing an input data stream comprising a sequence of groups of n words of GCLI bits, and for each group the value of GCLI, obtainable by the device according to claim 13, into an output data stream, comprising:
   means for producing an output data stream comprising for each word of GCLI bits of each group of the input stream, a word of m bits equal to the word of GCLI bits for the GCLI lowest-weight bits of said word of m bits, and zero bits for the (m-GCLI) highest-weight bit words.

* * * * *